Oct. 27, 1970 E. H. LAND 3,536,488
MULTICOLOR SCREEN-CARRYING ELEMENT IN ADDITIVE
COLOR PHOTOGRAPHIC PROCESSES
Filed June 13, 1968 2 Sheets-Sheet 1

INVENTOR.
Edwin H. Land
BY
Brown and Mikulka
and
Robert M. Ford
ATTORNEYS

United States Patent Office

3,536,488
Patented Oct. 27, 1970

3,536,488
MULTICOLOR SCREEN-CARRYING ELEMENT IN ADDITIVE COLOR PHOTOGRAPHIC PROCESSES
Edwin H. Land, Cambridge, Mass., assignor to Polaroid Corporation, Cambridge, Mass., a corporation of Delaware
Filed June 13, 1968, Ser. No. 736,796
Int. Cl. G03c 7/04
U.S. Cl. 96—24                                      44 Claims

ABSTRACT OF THE DISCLOSURE

Photographic element for additive color photographic process comprising, on one of its surfaces, a multicolor screen with a photosensitive silver halide emulsion containing at least two halides selected from iodides, bromides and chlorides, and containing also silver precipitating nuclei.

---

The present invention relates to photography and, more particularly, to photographic products and processes specifically adapted for color reproduction in accordance with the principles of additive color photography.

In general, color photographic reproduction may be provided by exposing a photoresponsive material such as, for example, a photosensitive silver halide emulsion, to selected subject matter through an optical screen element possessing filter media or screen elements of selected radiation modulating characteristics such as filter media selectively transmitting predetermined portions of the electromagnetic radiation spectrum's visible segment. The color information thus recorded is read out by viewing resultant image conformation in the photoresponsive material through the same or a similar screen element in appropriate registration with the image. For the reproduction of subject matter in color and in accordance with the principles of additive color photography, the individual filter media or screen elements constituting the optical screen will be constructed to effect selective filtration of predetermined portions of the visible electromagnetic spectrum substantially corresponding to its red, blue and green regions and color information recordation is accomplished by point-to-point incidence of radiation actinic to the selected photoresponsive material as modulated by such screen element. Visual reproduction of the information content recorded by the photoresponsive material is accomplished by read out of the impressed image as modulated by the original or a substantially identical screen element in accurate registration with the image record.

Additive color photographic reproduction thus may be provided by exposing a photoresponsive material, preferably a photosensitive silver halide emulsion, through an additive color screen having a plurality of filter media or screen element sets each of an individual additive color such as, red, blue or green, and by viewing the resultant photographic image, preferably a silver image, subsequent to development of such image, through the same or a substantially identical screen element suitably registered.

Although for color information recordation purposes, the photoresponsive material and optical screen may comprise separate and distinct elements appropriately registered during periods of exposure and viewing and the optical screen element may be temporarily or permanently positioned on the surface of a transparent carrier opposite that retaining the photoresponsive material, for practical purposes, it is preferred to permanently position the photoresponsive material in direct contiguous relationship to the color screen during exposure, in order to maximize the acuity of the resultant image record.

Subsequent to exposure of the photoresponsive material to actinic radiation transmitted through and filtered by the optical screen, the resultant photoexposed element may be further processed, where required, in accordance with the materials selected and generally without regard to the filter screen when the latter element is stable with respect to and/or protected from contact with the processing compositions and components selected. Such protection and stability will ordinarily be enhanced and facilitated by disposition of the filter screen between a transparent, processing composition impermeable carrier and the photoresponsive material, and, in particular, where such configuration additionally includes the presence of a processing composition barrier element or layer intermediate the screen and the photoresponsive material.

Subsequent to selective exposure of, for example, the preferred photoresponsive material, that is, photosensitive silver halide, the resultant exposed material may be processed in the same manner as black-and-white photographic film is conventionally processed. The photoexposed emulsion thus may be developed by any of the conventional developing procedures known in the art to be adapted to effect reduction of photoexposed silver halide crystals. In general, such development will be effected by contact of the photoexposed emulsion with a solution containing a conventional developing agent such as one or more of the conventional developing agents and compositions of same set forth in chapter 14 of The Theory of the Photographic Process (revised edition—1954), C. E. K. Mees, The Macmillan Co., New York, N.Y., and chapters VI, VII, VIII and IX of Photographic Chemistry, vol. I, P. Glafkides, Foundation Press, London, England. The preferred developing agents generally comprise organic compounds and, in particular, comprise organic compounds of the aromatic series containing at least two hydroxyl and/or amino groups wherein at least one of such groups is in one of ortho or para positions with respect to at least one other of such groups such as, for example, the various known hydroquinones, p-aminophenols, p-phenylene diamines, and their various known functional homologues and analogues. The developing composition containing the specific silver halide developing agents selected will generally comprise an aqueous solution additionally containing at least an alkaline material such as sodium hydroxide or sodium carbonate or the like and may be contacted with the photoexposed silver halide material according to any of the conventional tray, tank, or the like, procedures. The composition may additionally and optionally contain one or more specific silver halide developing agents, preservatives, alkalis, restrainers, accelerators, etc., other than those specifically denoted in the cited reference material. The concentration of the various components employed may be varied over a wide range and, where desirable, any one or more of such components may be disposed in the photosensitive element, prior to exposure, and in a separate permeable layer of such element and/or in the emulsion comprising the photosensitive silver halide material itself.

For the purpose of stabilizing the developed image, the emulsion may be fixed in any of the conventional fixing, washing, and/or drying procedures known in the art as, for example, those described in chapter XI of Photographic Chemistry, vol. I, supra, and chapter 17 of The Theory of the Photographic Process, supra. For example, the photosensitive material retaining the developed image may be initially contacted with a stop bath adapted to terminate action of the developing agent on the photosensitive emulsion by converting the pH of the emulsion to that at which the selected silver halide developing agent or agents exhibit substantially no developing potential. Specifically, where the silver halide developing agent is organic compound exhibiting its developing action in an alkaline pH, for example, a hydroquinone, or the like, the emulsion may be subjected to an acid stop bath for a sufficient time interval as to effectively neutralize the silver halide developing potential of the selected developing agent.

The emulsion may then be subjected to a fixing bath in order to effect removal of unexposed photoresponsive silver halide from the emulsion in accordance with the conventional procedures known to the art as adapted to effect same and as further detailed in the last cited references.

In general, the fixing agent employed may comprise a bath of a silver halide solvent such as sodium thiosulfate which is effective to remove substantially all types of silver halides from disposition in the emulsion strata originally containing the photosensitive silver halide without deleterious attack upon the conformation of the developed silver image. Subsequent to fixation, all residual traces of the fixing agent may be removed by aqueous wash contact, in order to insure the permanency of the developed image.

Where positive silver image formation is desired, that is, an image provided in terms of unexposed portions of the emulsion, reversal processing may be employed in its conventional manner, or a direct positive emulsion may be employed, or the positive image may be provided by diffusion transfer processing.

In the first alternative denoted above, the reversal processing may be accomplished in the conventional manner by developing the photoexposed emulsion by any of the conventional procedures known in the art as adapted to effect development of the latent image resultant from photoexposure such as, for example, the procedures identified above. Subsequent to development of the latent image to a visible silver image, the resultant developed image may be effectively removed in the conventional manner by contact of the image with any of the conventional agents known in the art as adapted to effect removal of a photographic silver image without deleterious effect upon unexposed photosensitive silver halide such as, for example, the bleaching agents and bleaching baths set forth in chapter XXX of Photographic Chemistry, vol. II, supra. Subsequent to the removal of the developed image by, for example, bleaching, the photosensitive silver halide remaining in the emulsion structure may be converted to a developable state by physical fogging resultant from, for example, exposure of actinic radiation, and/or chemical fogging, for example, by contact with a conventional fogging agent or the like, and, in turn, the resultant fogged silver halide may be developed and, where desired, stabilized, in the manner set forth above, to provide the requisite positive silver image formation.

In the second alternative denoted above, the requisite positive silver image formation may be provided by employment of a conventional direct positive silver halide emulsion which may be directly developed, in the presence of a fogging agent, according to the procedure described above, to provide the requisite positive silver image formation.

In the third alternative denoted above, the positive silver image formation may be provided by diffusion transfer processing wherein the latent image provided to the photosensitive silver halide emulsion by exposure is developed and, substantially contemporaneous with such development, a soluble complex is obtained, for example, by reaction of a silver halide solvent with unexposed and undeveloped silver halide of the emulsion. The resultant soluble silver complex may be, at least in part, transported in the direction of a suitable print-receiving element, and the silver of the complex precipitated in such element to provide the requisite positive silver image formation. Commensurate with the preceding alternatives denoted, the resultant positive silver image, in this embodiment, a silver transfer image, may be viewed through the same, or a similar, color screen element which is suitably registered with the positive silver transfer image carried by the print-receiving layer.

In each alternative, the preferred film units comprise a panchromatically sensitized photographic emulsion positioned contiguous a surface of a multicolor additive color screen which, in the last alternative denoted, may possess the print-receiving element intermediate a photographic emulsion and the color screen, either with or without a stripping layer positioned intermediate the print-receiving layer and the emulsion layer, to facilitate separation of the emulsion layer subsequent to transfer image formation. Employment of the preferred integral film unit allows exposure of the emulsion to be accomplished through a color screen, including through a transparent supporting member, if present, and formation of the requisite positive silver image in contiguous relationship to the color screen employed during exposure. Such embodiment accordingly obviates the necessity of registering the color screen with the resultant positive silver image, for viewing purposes, in that the screen employed for exposing may also be employed for viewing and is in automatic registration with the positive silver image.

Of the three alternatives denoted above, production of the positive image by diffusion transfer processing is clearly preferable to that denoted by the first alternative in view of the effective simplicity of the processing involved and is clearly preferable to that of the second embodiment by reason of the higher photographic speeds practicably obtainable.

Although, as disclosed in U.S. Pat. No. 2,614,926, the positive silver transfer image formation may be provided by an additive multicolor diffusion transfer reversal process which includes exposure of a silver halide emulsion layer through an additive color screen and separation of the emulsion layer, from contact with the remainder of the film unit, subsequent to processing, while retaining filter media and reception layer in fixed relationship, a preferred process will comprise that disclosed in U.S. Pats. Nos. 2,726,154 and 2,944,894, which are directed to a diffusion transfer reversal process which specifically includes exposure of an integral multilayer film assemblage through a screen possessing a plurality of minute optical elements and carrying photosensitive and image-receiving layers. As disclosed in the cited patents, transfer processing of the exposed film may be accomplished by permeation of the exposed integral film unit with a liquid processing composition and the image-receiving layer retained in permanent fixed relationship to the screen during, and subsequent to, formation of the requisite transfer image, with the operator's option of separating the photosensitive layer from the remainder of the film unit subsequent to transfer image formation.

As disclosed in U.S. Pat. No. 2,712,995, direct production of a positive silver image may also be provided by employment of a spontaneously developable silver salt dispersion, that is, a silver salt dispersion such as silver oxalate, silver stearate, silver ferrocyanide, or certain silver chloride dispersions, which is directly reduced to elemental silver in the absence of exposure to bromide ions and to actinic radiation, and thus not as a function of the point-to-point incidence of actinic radiation. In the disclosed structure, the image-providing, spontaneously developable silver salt dispersion contains the minimal concentration of photosensitive silver bromide required to effect release of bromide ions, from the silver bromide crystals upon development in the absence of bromide and as a function of exposure, in the concentration required to inhibit, imagewise, spontaneous development of the silver salt dispersion. As further stated in the cited patent, the spontaneous development reaction of the silver salt dispersion may be enhanced by the addition of substances which act as nuclei for the reaction and the employment of a processing composition containing a silver halide solvent such as sodium sulfite. However, as disclosed in the patentee's subsequent U.S. Pat. No. 2,937,945, the silver images obtained by the process of the preceding patent show the drawback that the whites are impaired by the negative image formed from the photosensitive material, that is, the silver bromide dispersion. It is there stated that it is necessary to be especially careful to keep the amount of the silver bromide as small as possible so that the visible silver image originating from development of such material does not exceed the critical threshold required for effective employment of the resultant image. The last-identified patent denotes the improvement which consists of improving the quality of resultant image by disposition of the respective spontaneously developable silver salt dispersion and photosensitive silver bromide dispersion in separate layers, maintained in contact during development, but separated from one another subsequent to formation of the positive silver image.

As disclosed in French Pat. No. 53,513, Third Addition to French Pat. No. 873,507, it was also known pre-existing the last two mentioned patents that a primary negative image and a secondary positive image may be provided by exposing a silver halogenide emulsion containing silver precipitating agents and sequentially treating the thus exposed emulsion first with a silver halide developing formulation which does not contain a silver halide solvent and then with a developer formulation which does contain a silver halide solvent and specifically a chromogenic developer formulation containing a silver halide solvent to provide, upon the subsequent elimination of the metallic silver images, the production of a colored positive image.

However, for a plurality of reasons set forth in detail hereinafter, it would be particularly desirable to possess the wherewithal to fabricate an integral film assemblage essentially comprising an optical screen element possessing, fixedly positioned in contiguous relationship to one surface, a photoresponsive material directly providing positive image formation and possessing the sensitivity to incident electromagnetic radiation and acuity of image formation necessary to effectively provide color photographic image reproduction in accordance with the principles of additive color photography.

Accordingly, it is a principal object of the present invention to provide new and improved photographic products, compositions and processes particularly adapted for the photographic reproduction of subject matter in color and particularly in accordance with the principles of additive color photography.

Other objects of the invention will in part be obvious and will in part appear hereinafter.

The invention accordingly comprises the process of the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 3:
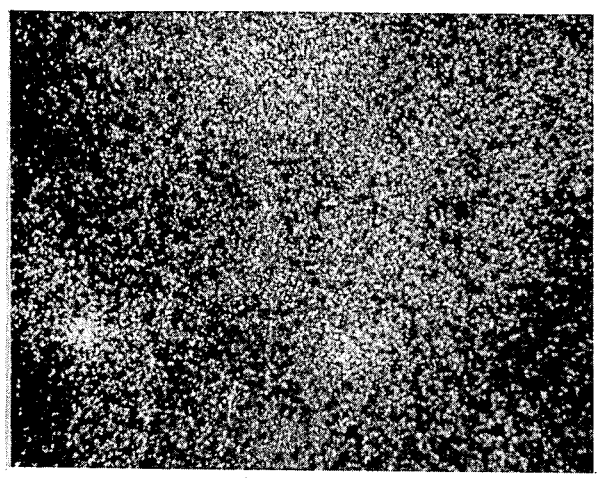
Figure 4:
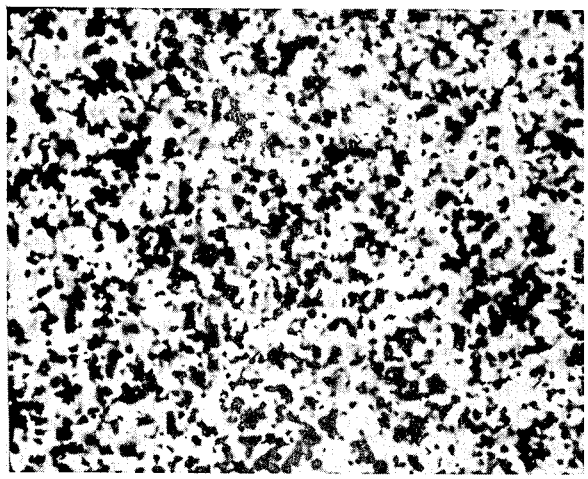
Figure 5:
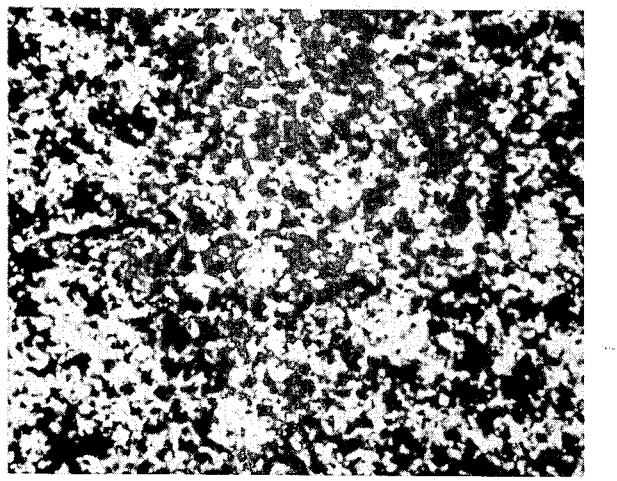
Figure 6:
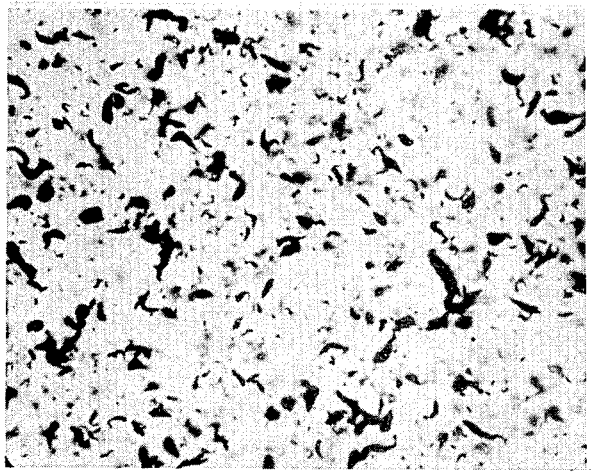

FIG. 3 is a photomicrograph of positive diffusion transfer silver image formation in a corresponding maximum density area of a silver transfer image, provided in accordance with the teachings of U.S. Pat. No. 2,861,885, infra, at a magnification of 1280×;

FIG. 4 is a photomicrograph of integral negative and positive silver image formation in a minimum density area of a silver image, provided in accordance with the present invention, at a magnification of 1280×;

FIG. 5 is a photomicrograph of negative silver image formation in a corresponding maximum density area of the photosensitive silver halide emulsion stratum of a silver diffusion transfer film unit fabricated and processed in accordance with U.S. Pat. No. 2,861,885, infra, at a magnification of 1280×; and FIG. 6 is a photomicrograph of negative silver image formation in a minimum density area of the photosensitive silver halide emulsion stratum of a silver diffusion transfer film unit, fabricated and processed in accordance with U.S. Pat. No. 2,861,885, infra, at a magnification of 1280×, which integrates with the maximum density area of the silver transfer image of FIG. 3 as an integral composite print to be viewed by reflection or transmission.

As previously stated, a silver diffusion transfer reversal process may provide a positive silver transfer image by development of the latent image provided a photosensitive silver halide emulsion by exposure and, substantially contemporaneous with such development, a soluble silver complex is obtained, by reaction of a silver halide solvent with unexposed and undeveloped silver halide of the emulsion. The resultant soluble silver complex is, at least in part, transported in the direction of a suitable print-receiving element and the silver of the complex there precipitated to provide the requisite positive silver image formation.

The silver receptive stratum employed may be so constituted as to provide an unusually effective silver precipitating environment which causes the silver deposited therein, in comparison with negative silver developed in the silver halide emulsion, to possess an extraordinarily high covering power, that is, opacity per given mass of reduced silver; see Edwin H. Land, One Step Photography, Photographic Journal, section A, pp. 7–15, January 1950.

Specifically, to provide such environment, silver precipitation nuclei may be disposed within the silver receptive stratum in clusters possessing a diameter directly proportional to the mass of image silver to be deposited in situ by reduction. Such conformation can be employed to cause image silver to precipitate, in association with the silver precipitation nuclei clusters, with the required density and of a size directly related to the physical parameters of the clusters. The image silver thus precipitated in situ in galaxies of chosen physical parameters provides image conformation in which the elemental silver of the print-receiving element may possess a very high order of covering power, for example, five to fifteen or more times that of the negative elemental image silver in the silver halide element.

As disclosed in U.S. Pat. No. 2,861,885, desirable composite prints comprising both negative and positive images in superposition may be provided by simplified silver diffusion transfer reversal processes employing a photosensitive silver halide emulsion which, upon full development of its exposed areas, as a function of exposure, provides a relatively low maximum density negative silver image with relation to the high maximum density positive silver image provided by a silver precipitating environment of the type detailed above. In a composite print produced in accordance with the disclosure of the cited patent, the covering power of a given mass of image silver in the print-receiving element is there stated to range from 14 to 15 times that of an equal mass of image silver in the silver halide element and, accordingly, for transparency employment a maximum negative density of as high as 1.0 density units may be permissible where the maximum positive density is about four or more times as great.

It has now been unexpectedly discovered that a photoresponsive material, specifically a photosensitive silver halide emulsion, fixedly maintained in contiguous relationship to an optical screen element, may be employed to provide a direct positive visible silver image possessing the acuity necessary for effective color reproduction in accordance with the principles of additive color photography. For such employment, the emulsion is specifically formulated to contain silver precipitating nuclei dispersed throughout in a concentration effective to provide, subsequent to exposure and development with a processing composition containing a silver halide developing agent and a silver halide solvent, a positive silver image derived from unexposed silver halide crystals possessing greater covering power than the negative silver image derived from exposed silver halide crystals.

In general, in accordance with the teachings of the photographic art, "physically" developed silver is directly reduced from a fluid phase during development and essentially comprises relatively compact grains. In contradistinction, "chemically" developed silver, in all known conventional processes, is directly furnished from exposed silver halide crystals and essentially includes image silver in the general form of "fibers" or "filaments." The covering power, that is, the optical density per gram of silver per square meter, of the resultant silver image, in each instance, is a function of the aggregation and conformation of developed silver and, in general, may be considered to be inversely proportional to the diameter of the particles, or grains as aggregated, in the absence of considerations with respect to aggregate conformation.

In conventional development practice, employing either so-called "physical" or "chemical," both types of development occur to an extent, however, "chemical" development is characterized by the fact that the major portion of the developed elemental silver is derived from direct chemical reduction of exposed silver halide crystals and only a substantially inconsequential proportion of developed elemental silver is derived from solution physical development. Conversely, "physical" development is characterized by the fact that a predominant proportion of the developed silver is derived from direct solution physical development and only a minimal proportion of the resultant image silver is derived from chemical development.

In accordance with the unexpected discovery which constitutes the present invention, however, a photosensitive silver halide emulsion may be fabricated to provide as a function of exposure, upon development in the presence of a silver halide solvent, elemental silver image formation of a character previously unknown to the photographic art. Specifically, it has been now discovered that image silver derived from direct development, in the presence of a silver halide solvent, of photoexposed silver halide crystals comprising an emulsion formulation fabricated as detailed herein, that is, photoexposed silver halide crystals having directly associataed therewith an effective concentration of silver precipitating nuclei, is characterized by the substantial absence of "fiber" or "filamentary" conformation. The image silver conformation so provide is substantially restricted to elemental silver grains or particles possessing a diameter substantially equal to the original diameter of the unexposed photosensitive crystals constituting the emulsion. Amplification of the thus produced negative silver image to provide an optical density beyond that provided by elemental silver image particles or grains of a diameter directly comparable to the emulsion's original crystal diameters, generally ranging in size from about 1 to 3.5 microns in "high speed" photographic materials, resultant from increased image grain diameter pursuant to crystal surface area growth, directly or by reason of elemental silver fiber or filament production, has been discovered to be effectively prevented by development of the emulsion's exposed silver halide crystals in direct contiguous relationship with silver precipitating nuclei, present in an effectively inhibiting concentration, with a processing composition containing a silver halide solvent.

Photosensitive silver halide emulsions of the "high speed" type generally employed for photographic reproduction are characterized by the presence of photoresponsive silver halide crystals possessing active senstivity centers or sites which are believed to comprise minute aggregates of silver sulfide, the sulfide of which is derived from active sulfur naturally present initially in the polymeric matrix, for example, a gelatin matrix, or added to the formulation during fabrication. For optimum sensitivity there should be a limited but effective number of sensitivity sites in each crystal, particularly at the surface of the crystals. Upon exposure to incident electromagnetic radiation actinic to the crystals, it is understood that photons absorbed by the crystals provide photoelectrons within the crystals which are capable of diffusion to the sensitivity sites which possess a lower conductivity bond level and, in effect, provide such sites with a negative charge which precipitates, at the sites, as elemental silver, free silver ions originally disposed within the crystal lattice. During development of the exposed silver halide crystals, the silver halide developing agent, a reducing agent, provides additional electrons which serve to effect precipitation of additional silver ion of the crystals resulting in the extrusion of fiberous or filamentary elemental silver at surface sensitivity sites and which continues until reduction of the crystals is complete.

The presence of the silver precipitating nuclei contiguous the silver halide crystals during the development process effectively acts to substantially prevent the microscopic elemental silver filament or fiber extrusion beyond the crystal surface with the concomitant result of restricting image grain size to that of the crystal. Accordingly, the covering power of the resultant negative image in each instance is limited to that provided by elemental silver grains or particles possessing a diameter substantially equally to that of the original crystals dispersed in the photosensitive matrix and absent amplification due to the diameter increase of conventional negative image elements resultant from filamentary image silver.

For the purpose of insuring the production of a positive image possessing a high covering power, the silver precipitation nuclei will be disposed within the photosensitive silver halide emulsion in a concentration per unit area effective to cause image silver derived from unexposed silver halide crystals to possess the desired opacity per given mass of in situ reduced silver.

Figure 2:
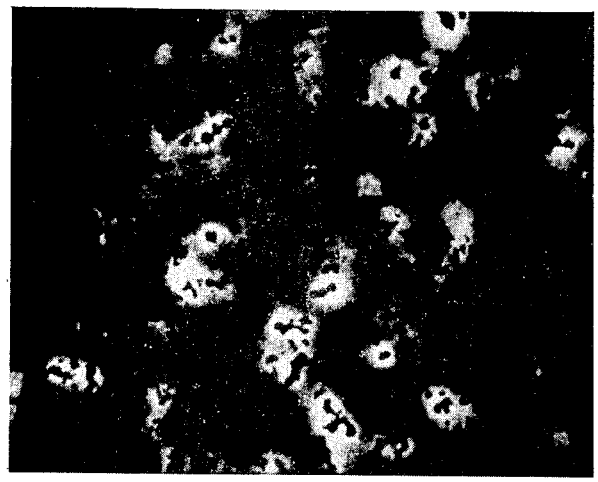
FIG. 2 is a photomicrograph of integral positive and negative silver image formation in a maximum density area of a silver image provided, in accordance with the present invention, at a magnification of 1280×.

Reference to the photomicrographs comprising FIGS. 2 to 6, inclusive, of the drawings, further illustrates in factual detail the preceding discussion. FIG. 2 is a photomicrograph, having a magnification factor of 1280:1, of integral positive and negative image silver in a maximum density area, provided in accordance with the present invention, employing a film unit fabricated and processed as detailed hereafter. For the purposes of direct comparison with the results detailed in the photomicrograph of FIG. 2, FIG. 3 is a photomicrograph, having the same magnification, of positive diffusion transfer image silver in a corresponding maximum density area, provided in accordance with the disclosure of U.S. Pat. No. 2,861,885, discussed above, employing a film unit fabricated and processed as detailed hereafter. As can be readily observed from examination of the respective photomicrographs, the covering power of the image provided by the film unit fabricated and processed in accordance with the present invention clearly exceeds that of the comparative film unit by a grossly extensive margin. It would appear that the high covering power properties of FIG. 2's film unit may be due, in large part, to the unexpectedly efficient utilization of silver accorded by reason of the present invention; the specific mathematical percent gain of which is detailed hereafter.

FIG. 4 is a photomicrograph of integral negative and positive image silver, in a minimum density area, of the image provided by the film unit of FIG. 2 and at the same magnification. Again, for the purpose of direct comparison with the results detailed in the photomicrograph of FIG. 4, FIG. 5 details negative image silver formation in a corresponding maximum density area of the film unit of FIG. 3's silver halide emulsion stratum at the same magnification. Analogous to the comparative evaluation of FIGS. 2 and 3, FIGS. 4 and 5 clearly detail the undesirably high negative covering power of the image in FIG. 5, by reason of the aforementioned amplification of the negative image, as compared with the image provided in FIG. 4 by means of the present invention. Thus, FIGS. 2, 3, 4 and 5 illustrate not only the greater optical density range to be achieved by means of the present invention in a directly comparative situation, that is, an expanded signal to noise ratio but, in addition, the clearly depressed base density or noise level to be achieved by the present invention.

There is directly illustrated by examination of the photomicrograph of FIG. 6, optical density amplifying negative filamentary image silver formation in a minimum density area of the film unit of FIG. 3's silver halide emulsion stratum, at the same magnification as the preceding photomicrographs, which may be positioned in contiguous overlying relationship with the illustrated maximum density area of FIG. 3 to provide a composite silver transfer image.

There is thus provided by means of the present invention photosensitive silver halide crystals or grains dispersed in an environment containing silver precipitating nuclei or agents which in the presence of a solvent developer composition cause exposed grains to be reduced to opaque structures smaller in presented area than the area of the same grains developed in an identical developer composition absent such precipitating nuclei. Silver image masses derived from exposed silver halide grains developed in accordance with the present invention, accordingly, possess low optical covering power as compared with the covering power provided by identical grains developed in the same solvent developer absent the presence of the precipitating environment. Specifically, the present invention provides for the production of a direct positive silver image in which the mass distribution of silver is substantially uniform macroscopically and nonuniform microscopically, and in which the transmissiveness of silver image mass is a function of the quantity of actinic radiation which exposed the photosensitive silver halide. The exposed silver halide grains are reduced, in situ, as compact masses possessing low covering power simultaneously with reduction, in situ, of unexposed silver halide grains as colloidal dispersion possessing high covering power. The direct positive silver image thus produced in situ by means of the present invention possess extraordinary high sharpness when compared with transfer processes in which unexposed silver halide grains are dissolved and transferred to the ultimate image-carrying site.

In accordance with a particularly preferred embodiment of the present invention, the emulsion carrying the image silver is fabricated to substantially prevent microscopic distortion of the image conformation by preventing microscopic migration or diffusion of image elements within the polymeric matrix. In general, conventional photographic image elements may ordinarily comprise a microscopically dynamic system without seriously noticeable disadvantage to the conventional employment of the image. However, for particularly accurate color reproduction in accordance with the principles or additive color photography, microscopic distortion of image elements is preferably obviated to insure maximization of the accuracy of image registration with the appropriate individual optical filter elements of the additive color screen associated with the image-carrying element. Specifically, it has been found that a photosensitive silver halide emulsion, comprising photosensitive silver halide crystals dispersed in a polymeric binder possessing a latice effective to substantially prevent microscopic migration or diffusion of image silver, provides color reproduction acuity particularly desired for effective color reproduction in the manner previously described.

The desired polymeric binder latice property may be readily achieved by selection of a polymeric material possessing the property of sufficiently fixing spacially image components, or a polymeric material, otherwise desired, may be modified, for example, by crosslinking and/or hardening, to the extent necessary to provide the desired spacial maintenance of image components, that is, a rigidity effective to maintain positive image components in registration with the individual optical filter elements of the color screen through which the photosensitive emulsion was exposed. For example, the preferred polymeric binder material, that is, gelatin, may be hardened by contact with conventional hardening agents to the extent necessary to provide the desired rigidification of the photographic image. Where desired, discrete particulate materials facilitating increased processing composition penetration of the photosensitive element, without deleterious effect on the polymeric matrix's lattice, may be advantageously incorporated in the photosensitive element for the purpose of expediting processing of the element.

In a preferred embodiment of the present invention, the photosensitive silver halide emulsion will be fabricated, as further specifically detailed hereinafter, to provide a differential of 1.5 density units between the maximum image density of the developed negative silver image and the maximum image density of the developed positive silver image. In a particularly preferred embodiment, the photosensitive silver halide emulsion will be fabricated to provide a maximum image density of less than about 0.5 and, more particularly, less than about 0.3 density units upon development of completely exposed areas of the emulsion and will possess silver precipitating nuclei in a concentration effective to provide a maximum image density in excess of about 2.0 and, most preferably, in excess of about 2.4 density units upon development of unexposed areas of the emulsion. In such preferred embodiment, the silver halide emulsion will ordinarily comprise not less than 50 milligrams per foot square silver halide, based on weight of silver, preferably, as a mixed silver halide and, more preferably, as silver iodobromide, particularly that containing about 1 to 9 percent iodide, by weight of silver, dispersed in a permeable colloid binder which, in the preferred embodiment, comprises gelatin sufficiently hardened to provide the last-mentioned optical parameters and a hydration factor, upon contact of aqueous processing composition preferably possessing a pH in excess of about 12, effective to prevent swelling in excess of a magnitude equal to its ambient size within a period of less than about 15 seconds.

Figure 1:
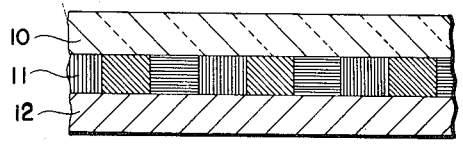
FIG. 1 is a diagrammatic enlarged cross-sectional view illustrating the association of elements constituting one embodiment of the present invention, the thickness of the various materials being exaggerated.

Referring to FIG. 1, there is shown a diagrammatic enlarged cross-sectional view of a film unit constructed in accordance with a preferred embodiment of the present invention. The film unit is shown to specifically comprises a flexible transparent film base or support member 10 carrying on one surface, in order, an additive color screen 11 comprising a geometrically repetitive plurality of actinic radiation-filtering colored elements including a set or group of primary red-colored filter elements, a set of primary blue-colored filter elements and a set of primary green-colored filter elements arranged in a repetitive distribution in side-by-side relationship in a substantially single plane, and a photosensitive silver halide emulsion 12 containing dispersed therethroughout silver precipitating nuclei.

The photoresponsive material of photographic emulsion 12 will, as previously described, preferably comprise a crystal of a compound of silver, for example, one or more of the silver halides, such as photosensitive silver chloride, silver iodide, silver bromide, or mixed silver halides, such as silver chlorobromide or silver iodobromide, of varying halides ratios and varying silver concentrations dispersed in a processing composition permeable binder material which additionally contains silver precipitating agents dispersed throughout the emulsion in a concentration effective to provide a vigorous elemental silver precipitating environment which causes the elemental silver deposited therein in terms of the unexposed areas of the emulsion, as a function of its point-to-point degree of exposure, in comparison with exposed areas of the emulsion, to possess with high covering power, that is, opacity per given mass of reduced silver.

In general, silver precipitating nuclei comprise a specific class of adjuncts well known in the art as adapted to effect catalytic reduction of solubilized silver halide specifically including heavy metals and heavy metal compounds such as the metals of Groups I–B, II–B, IV–A, VI–A, and VIII and the reaction products of Group I–B, II–B, IV–A, and VIII metals with elements of Group VI–A, and may be effectively employed in a relatively low concentration in the order of about $1\text{--}25 \times 10^{-6}$ moles/ft.$^2$.

Especially suitable as silver precipitating agents are those disclosed in U.S. Pat. No. 2,698,237 and specifically the metallic sulfides and selenides, there detailed, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$, and especially the salts of zinc, copper, cadmium and lead. Also particularly suitable as precipitating agents are heavy metals such as silver, gold, platinum and palladium and in this category the noble metals illustrated are preferred and are generally provided in the matrix as colloidal particles.

The preferred silver halide type photographic emulsion 12, employed for the fabrication of the photographic film unit, may be prepared by reacting a water-soluble silver halide, such as ammonium, potassium or sodium bromide, preferably together with a corresponding iodide, in an aqueous solution of a peptizing agent such as colloidal gelatin solution; digesting the dispersion at an elevated temperature, to provide increased crystal growth; washing the resultant dispersion to remove undesirable reaction products and residual water-soluble salts, for example, employing the preferred gelatin matrix material, by chilling the dispersion, noodling the set dispersion, and washing the noodles with cold water, or, alternatively, employing any of the various floc systems, or procedures, adapted to effect removal of undesired components, for example, the procedures described in U.S. Pats. Nos. 2,614,928; 2,614,929; 2,728,662, and the like; after-ripening the dispersion at an elevated temperature in combination with the addition of gelatin or such other polymeric material as may be desired and various adjuncts, for example, chemical sensitizing agents and the like; all according to the traditional procedures of the art, as described in Neblete, C. B., Photography—Its Materials and Processes, 6th ed., 1962.

Optical sensitization and preferably panchromatic sensitization of the emulsion's silver halide crystals may then be accomplished by contact with optical sensitizing dye or dyes; all according to the traditional procedures of the art, or described in Hamer, F. M., The Cyanine Dyes and Related Compounds.

Subsequent to optical sensitization, any further desired additives, such as coating aids and the like, may be incorporated in the emulsion and the mixture coated on color screen 11 according to the conventional photographic emulsion coating procedures known in the art.

As the binder for the photoresponsive material, the aforementioned gelatin may be, in whole or in part, replaced with some other natural and/or synthetic polymeric material such as albumin; casein; or zein; or resins such as a cellulose derivative, as described in U.S. Pats. Nos. 2,322,085 and 2,541,474; vinyl polymers such as described in U.S. Pats. Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

Production of color screen 11, in accordance with the art, may be classified into two major groups.

First, color screens may be prepared by totally mechanical means, as for example, by printing or ruling a dyeable substrate, for example, with a greasy ink formulation, in accordance with the desired filter pattern; subjecting the substrate to suitable coloration, in areas which do not possess the repellant ink mask; effecting removal of the mask; and repeating this procedure, in accordance with the geometrical pattern of filter elements desired, a sufficient number of times to provide the desired multiplicity of diversely colored filter elements.

A second mechanical method comprises directly printing a carrier substrate with the desired dye formulations in accordance with the predetermined filter pattern and repeating this printing procedure a sufficient number of times to provide the multiplicity of colored filter elements desired.

A third mechanical method comprises depositing, as an irregular filter screen pattern, a thin layer comprising a random distribution of small grains, such as starch grains, which have been independently colored with the colors desired for optical filtering effects.

The second major type of color screen production procedures comprises photomechanical methods of the type initially proposed by, for example, Ducos Du Hauron in the nineteenth century. These procedures comprise, in general, coating a suitable support or film base with an adhesive composition having coated thereon a photosensitive colloid composition, as for example, dichromated gelatin; effecting exposure of the sensitive gelatin layer by incident actinic radiation, through a suitable mask which provides an exposure pattern devised in accordance with the desired optical filter element arrangement; effecting differential hardening of the sensitized material as a function of the point-to-point degree of exposure; removing unexposed unhardened material by solvent contact; and then subjecting the remaining hardened material to a suitable dyeing procedure in order to provide a first-colored optical filter element series. This procedure is then repeated, empolying appropriate masks, as often as necessary to provide the number of optical filter element types desired in the final color screen element.

Because mechanical methods of producing color screen by mechanical printing or ruling methods inherently require a great number of mechanically exact printing steps to provide a finished product, and thus possess the relative high cost inevitable to such complexity of production, and methods of mechanically producing mosaic type color screen elements have, in general, provided elements inherently lacking in color balance, due to areas posessing a predominance of particles of one color, that is, statistical clumping, as a practical result of attempted random distribution, and require the employment of extremely fine colored grains in order that formation of random aggregates of the same color may be decreased, which, however, gives rise to the additional disadvantage that the thus-prepared units then require very fine grain photographic emulsions and are thus restricted to employment in low speed photographic processes, experience as determined that photomechanical methods of color screen production are to be preferred, especially for high volume, low cost manufacturing operations for production of screen of commercially significant optical acuity.

Although color screen may be produced by traditional contact printing or projection type photomechanical processes, a particularly preferred process for the production of color screen comprises the process set forth in U.S. Pat. No. 3,284,208 which includes, in essence, successively coating the smooth surface of a lenticular film with a plurality of photoresponsive layers and sequentially subjecting the coatings to selectively displaced radiation incident on, and focused by the lenticules receiving same, in order to provide selective exposure of the coating. Subsequent to each exposure, unexposed coating is removed and the resultant resist dyed in order to provide a series of chromatic filter elements, prior to the deposition of the next succeeding photoresponsive layer. Each such exposure is derived from electromagnetic radiation incident on the lenticular film at an angular displacement specifically adapted to provide the desired plurality of chromatic filter element series in substantial side-by-side or screen relationship and adapted to filter predetermined wavelengths of light.

The line depth exposure of the photoresponsive layers may be accurately controlled by suitably varying the intensity or time of the incident radiation and the color screen itself may be continuous or discontinuous and, in the former instance, may comprise an endless or seamless element.

For the preparation of the preferred trichromatic additive screens, the exposed area of each photoresponsive area will generally comprise about one-third of the layer contiguous each lenticule reecving exposing radiation. Although all three exposures may be accomplished by radiation incident on the lenticules of the lenticular film at three separate angles each adapted to provide exposure about one-third of the area contiguous each lenticule receiving radiation, it will be recognized that the terminal chromatic filter formation may also be provided by exposing the terminal photoresponsive layer to diffused radiation traversing through the lenticular film and masked by the previously formed chromatic filter elements. Where desired, one or more sets of images resultant from exposure may be overlapped to decrease variation in the width of the exposed areas. While it is not essential that the exposing radiation incident on each lenticule form exactly the same angle of incidence, with respect to the axis of that lenticule, as in formed between radiation incident on other lenticules, and their respective axes, the more identical the correspondence between the angular pattern of incident radiation the greater the facility of registering the respective filter elements and the more uniform the resultant color screen.

At a stage subsequent to formation of the first and second series of filter elements, the lenticular configuration will be constituted as a continuous smooth surface. In the instances where the lenticules comprise a separate stratum temporarily affixed to the surface of a support on which the color screen is formed, such separate stratum may be stripped from the support. Alternatively, where the lenticules comprise an integral component of the film base or support and have been provided to the base by pressure and/or solvent deformation of the base, a continuous smooth surface may be reconstituted by application of suitable solvent and the deformation pressures produced during the manufacturing of lenticular film base released to provide reconstitution of the base's original configuration. Where desired, for example, for optical transmission purposes, the reconstituted surface may be polished, for example, by surface contact with an appropriate rotating polishing cylinder or drum, for the time interval necessary to provide the desired optical characteristics to the film base surface.

Optionally the external surface of the multichromatic screen may be overcoated with a protective polymeric composition, such as nitrocellulose, cellulose acetate, and the like, for the purpose of protecting the screen from processing composition deformation during employment of the resultant film unit. The external surface of the color screen may then have applied thereto silver halide emulsion layer 12.

Apparatus particularly adapted to facilitate effecting exposure of the lenticular film in accordance with the afore- mentioned U.S. Pat. No. 3,284,208 is disclosed and claimed in U.S. Pat. No. 3,318,220.

Support or film base 10 may comprise any of the various types of transparent ridged or flexible supports, for example, glass, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetatebutyrate, or acetate propionate; polycarbonates; polystyrenes; and the like.

The present invention will be illustrated in greater detail in conjunction with the following specific example which sets forth a representative fabrication of the film units of the present invention, which however, is not limited to the detailed description herein set worth but is intended to be illustrative only.

The smooth surface of a lenticular film comprising a polyester film base having bonded to one surface a cellulose acetate butyrate layer comprising 550 lenticules per inch, each having a plano-convex configuration for condensing the incident radiation into converging rays and having a focal length generally in the order of about 100 microns in air and, as a result of this short focal length, imaging objects over about one inch from the lens surface at infinity, may be coated on the opposite surface with an adhesive composition comprising 70 cc. of methanol, 1.25 grams of nitrocellulose, and 30 cc. of butyl alcohol. A first layer of gelatin sensitized by the addition of 15 weight percent potassium dichromate (based on dry gelatin), may then be coated on the external surface of the first adhesive layer. The first gelatin layer may then be exposed to ultraviolet radiation, in accordance with the previously detailed explanation, and the resultant photoexposed carrier subjected to a water wash in order to provide removal of unexposed sensitized gelatin, in accordance with the exposure pattern contained in the first gelatin layer. The web may then be treated with an acid dyeing bath comprising 1.17% Direct Red C.I. 81; 0.32% Direct Yellow C.I. 4; and 2.95% glacial acetic acid, rinsed to effect removal of excess dye, dried and a second adhesive composition containing 70 cc. of methanol, 30 cc. of butyl alcohol, and 1.25 grams of nitrocellulose overcoated thereon. A second layer of gelatin sensitized by the addition of 15 weight percent potassium dichromate may be coated on the second adhesive layer. The second photosensitized gelatin layer may be also exposed to ultraviolet radiation in accordance with the previously detailed description. The second gelatin layer may then be washed with water to effect removal of unexposed photosensitive gelatin, in the manner previously detailed, and the remaining gelatin resist dyed by contact with an acid dyeing bath containing 0.83% Acid Green C.I. 7; 0.32% Direct Yellow C.I. 4; and 2.86% glacial acetic acid. The web may then be rinsed to effect removal of any residual excess dye, dried and coated with a third adhesive composition comprising 30 cc. butanol, 1.25 grams of nitrocellulose, and 70 cc. of methanol. A third layer of gelatin sensitized with 15 weight percent potassium dichromate may then be coated on the external surface of the third adhesive layer and the third photosensitive gelatin layer subjected to exposure by ultraviolet radiation, in accordance with the description detailed previously. The third layer of photosensitive gelatin may then be washed in order to provide the desired resist formation and the resultant resist dyed by contact with a solution containing 1.0% Blue T Pina and 1% glacial acetic acid, washed to effect removal of residual dye and dried. A protective overcoat layer may be provided by coating the external surface of the multicolor screen element with a composition comprising 70 cc. methanol, 30 cc. butanol, and 5 grams of nitrocellulose.

Subsequent to formation of the color screen, the lenticulated cellulose acetate butyrate may be removed from the polyester base and the external surface of the polymeric protective coating may be coated with a composition comprising gelatin, deacetylated chitin and 4,6-diamino-ortho cresol at a coverage of 3.75 mgs./ft.² gelatin, 3.75 mgs./ft.² deacetylated chitin and 0.7 mgs/ft.² diamino-ortho cresol. On the external surface of the gelatin layer a hardened gelatino silver iodobromide emulsion containing cadmium sulfide and silica may then be coated at a coverage of 200 mgs./ft.² gelatin, 100 mgs./ft.² silver, 0.97 mgs./ft.² cadmium sulfide, 0.026 mgs./ft.² chrome alum, 0.78 mgs./ft.² algin, and 200 mgs./ft.² silica. The resultant film unit may then be advantageously overcoated with a hardened gelatin composition at a coverage of 25 mgs./ft.² gelatin, 0.013 mgs./ft.² chrome alum, 0.39 mgs./ft.² algin, and 50 mgs./ft.² silica.

The gelatino silver iodobromide emulsion employed may be prepared by heating a mixture comprising 80 grams of gelatin in 880 grams of water at a temperature of about 40° C. for the period required to dissolve the gelatin. The pH of the resultant solution may be adjusted to 10±0.1 and 8.8 grams of phthalic anhydride in 61.6 cc. of acetone added to the solution over a period of 30 minutes. Subsequent to addition of the phthalic anhydride the reaction mixture may be maintained at the stated temperature and pH for a period of about 30 minutes and then adjusted to a final pH of about 6.0.

To a solution comprising 226 grams of the gelatin phthalic anhydride derivative, prepared as above, 161 grams of potassium bromide, 2 grams of potassium iodide, and 1200 grams of water may be added a solution comprising 200 grams of silver nitrate in 1600 grams of water, at a rate of about 140 cc. per minute, for a period of about 3 minutes, held 10 minutes and the addition continued for a period of about 9 minutes. The resulting emulsion may then be precipitated by reducing the pH to about 2.5–3.0 with sulfuric acid. The precipitate may then be separated from the supernatant liquid and washed until the wash water is essentially free of excess potassium bromide. Ninety-five grams of gelatin may then be added to the precipitate, the volume adjusted with water to 845 cc., and dissolved by heating to about 38° C., for about 20 minutes, at a pH of about 5–6, and about 1.0 cc. of 1 N potassium bromide added to the emulsion. To the reaction mixture, at about 56° C., may be added about 5 cc. of a solution containing 0.1 gram of ammonium thiocyanate in 9.9 cc. of water and 0.4 cc. of a solution containing 0.097 gram of gold chloride in 9.9 cc. of water, and the mixture ripened at that temperature for about 37 hours. The resultant emulsion may then be panchromatically sensitized by the sequential addition of 0.1%, by weight, methanol solutions of anhydro 5,5′-diphenyl-3,3′-bis-(4-sulfobutyl)-9-ethyl-oxacarbocyanine hydroxide and anhydro 5,5′-dimethyl-3,3′-bis-(3-sulfopropyl)-9-ethyl-thiacarbocyanine hydroxide in optionally effective concentrations. To the resultant panchromatically sensitized silver iodobromide emulsion, there may then be provided, prior to coating, the cadmium sulfide silver precipitating agent, formed in situ by the addition of substantially equimolar quantities of cadmium nitrate and sodium sulfide solutions, and the siliceous porosity providing an antiswelling agent.

The film unit, fabricated as detailed above, may be subjected to exposing electromagnetic radiation incident on the transparent base and developed by contacting the film unit for about 2 seconds with a processing composition comprising 180 cc. of water, 8.33 grams of sodium hydroxide, 16 grams of sodium thiosulfate, 6.48 grams of sodium sulfite, 0.42 gram of 6-nitrobenzimidazole, and 5 grams of 2,6-dimethylhydroquinone, to provide production of a positive silver image possessing the optical characteristics described hereinbefore and the acuity required for additive color reproduction.

A film unit fabricated and processed in the manner detailed above exhibited a $D_{max.}$ silver coverage of 160 mgs./ft.² and a $D_{min.}$ silver coverage of 166 mgs./ft.² and an optical density of 2.90 and 0.65, respectively. The covering power of the film equaled at $D_{max.}$ 179 and at $D_{min.}$ 37.5 calculated as $$C.P. = \frac{\text{Optical Density}}{\text{g. Ag/dm.}^2}$$

Comparison of a film unit fabricated and processed in the manner detailed above, versus a film unit fabricated and processed in the same manner with the exception that the stated silver precipitating nuclei were dispersed in a separate processing composition permeable layer coated on the surface of the photosensitive silver halide emulsion opposite that carrying the color screen and from which film unit the photomicrographs denoted as FIGS. 3, 5 and 6 were provided, clearly illustrates the highly efficient utilization of silver provided by means of the present invention. Specifically, a film unit fabricated and processed in accordance with the present invention, possessing an initial silver coverage of 128 mgs./ft.² prior to exposure and processing, provided subsequent to exposure and processing in image $D_{max.}$ areas 118 mgs./ft.² of positive and negative image silver for a percent silver utilization in the order of 92%. In contradistinction, a comparative film unit possessing the silver precipitating nuclei disposed in a separate layer contiguous the photosensitive silver halide emulsion layer, possessing an initial silver coverage of 133 mgs./ft.² prior to exposure and processing, exhibited subsequent to exposure and processing in areas of maximum positive image density 61 mgs./ft.² of positive image silver and an overlying negative image silver coverage of 40 mgs./ft.² for a total percent silver utilization of 76 percent.

Additional film units may be fabricated and processed in the manner detailed above and optimized to exhibit a $D_{max.}$ of 3.3 and a $D_{min.}$ of 0.3 and to thus provide a differential of 3.0 density units and, in effect, a percent transmission ratio of about 1,000:1, and, where desired, for example, by reason of selected color screen parameters, a $D_{max.}$ of 4.0 and a $D_{min.}$ of 0.3 to provide a differential of 3.7 density units and thus a percent transmission ratio of about 5,000:1.

In contradistinction to developed negative image silver in conventional processes, including the silver diffusion transfer reversal process identified above as providing the photomicrographs of FIGS. 3, 5 and 6, film units fabricated and processed in accordance with the present invention clearly exhibit substantially no negative image "fiber" or "filament" formation and, accordingly, substantially no negative image amplification resultant from such conformation.

The film units of the present invention are particularly desirable for employment as a ciné film for additive color-motion picture projection, in addition to slide tranparency film, by reason of the inherent ability to simply and effectively process such film employing relatively simple and stable processing compositions, immediately subsequent to exposure, without the necessity of providing a process and apparatus adapted to effect stripping of a separate emulsion stratum from the remainder of the film unit, to provide color information recordation possessing the image integrity and reproduction characteristics required for effective employment of the film.

As denoted by the illustrative example, the photosensitive silver halide emulsion may have advantageously incorporated therein discrete particulate materials providing increased porosity to the emulsion, without deleterious effect on the dimensional stability of the emulsion binder lattice, in particular, those materials which additionally act as an antiswelling agent for the emulsion's polymeric binder material and, accordingly, act to facilitate the prevention of the polymer carried image's microscopic distortion, particularly, with respect to an associated color screen, such as discrete silica particles dispersed, for example, in a concentration of about 0.3 to 1.5 parts silica per part polymer, for the purpose of facilitating processing composition permeation of the emulsion. In addition, the emulsion stratum may be advantageously overcoated with a processing composition permeable polymeric material such as a hardened gelatin pad or the like to advantageously promote uniformity in processing composition premeation of the emulsion, by modulating any wave front resultant from initial surface contact with the liquid employed and to thereby promote uniform maintenance of the polymeric binder's physical characteristics.

Although the illustrative example employed chrome alum and particularly algin as hardening agents for the polymeric gelatin emulsion binder and a hardening agents for the polymeric gelatin overcoat, it will be recognized that substantially any hardening or crosslinking agent may be employed, where necessary, which does not provide deleterious photographic effects, to the extent required to provide a polymeric lattice which effectively inhibits to a substantial effect, migration of image silver. An extensive collection of hardening agents are disclosed in the art as specifically adapted to effect hardening or crosslinking of photographic polymeric binder material compositions and by reason of their innocuous photographic effects are to be preferred in the practice of the present invention. The sole requirement for effective operation of the film unit is that the emulsion's polymeric lattice be constructed to provide the optical image parameters denoted hereinbefore. Thus, substantially any conventional hardening and crosslinking agent may be selected from those set forth throughout, for example, the pertinent patent literature regarding such agents, and the concentration employed, as known in the art, will be dependent upon the relative activity of the selected agent, or agents, and the relative amount of hardening or crosslinking to be effected. The specific concentration of a selective hardening or crosslinking agent, to be contacted with a selected polymeric binder, may be readily determined empirically, within the specific context of ultimate photographic employment, by screening. It will be further recognized that any of the various processing composition permeable, synthetic or natural polymeric materials, possessing the physcial characteristics required to provide the results denoted above, may be substituted in replacement of the specifically illustrated polymeric material, gelatin, provided that such selected polymer provides a matrix which is not deleterious to photosensitive silver halide crystals and possesses a lattice allowing development in the manner previoiusly described.

Suitable silver halide solvents for employment in the practice of the present invention include conventional fixing agents such as the previously noted sodium thiosulfate, sodium thiocyanate, ammonium thiocyanate, the additional agents described in U.S. Pat. No. 2,543,181, and the associations of cyclic imides and nitrogenous bases such as associations of barbiturates or uracils and ammonia or amines and other associations described in U.S. Pat. No. 2,857,274.

Where desired conventional silver toning agent or agents may be disposed within the emulsion composition in a concentration effective to provide a positive image toned in accordance with the desires of the operator.

In the preferred embodiment of the present invention, the processing composition will include an alkaline material, for example, sodium hydroxide, potassium hydroxide or sodium carbonate, or the like, and most preferably in a concentration providing a pH to the processing composition in excess of about 12. The processing composition may, where desired, contain the sole silver halide developing agent or agents employed, or a silver halide developing agent in addition to that disposed within the film unit; however, disposition of one or more developing agents in the emulsion and/or a permeable layer directly associated therewith, intermediate the emulsion and a color screen, is a particularly preferred embodiment, for the purpose of providing unexposed image acuity, which more readily facilitates directly initiated development at radiation exposed areas of the emulsion without the necessity of diffusing such agents to such sites by means of the processing composition selected.

It will be apparent that the relative proportions of the agents comprising the developing composition set forth herein may be altered to suit the requirements of the operator. Thus, it is within the scope of this invention to modify the herein described developing compositions by the situation of preservatives, alkalis, silver halide solvents, etc., other than those specifically mentioned. When desirable, it is also contemplated to include, in the developing composition, components such as restrainers, accelerators, etc. The concentration of such agents may be varied over a relatively wide range commensurate with the art.

The processing composition solvent employed, however, will generally comprise water and will possess a solvent capacity which does not deleteriously hydrate the selected emulsion polymer's lattice beyond that required to provide the preferred image formation. Accordingly, no adjunct should be included within such composition which deleteriously effects the lattice parameters required for such image formation.

In the description herein, each color series of filter elements has been described as covering that part of the total area in proportion to the total number of colors used, i.e., in the tricolor system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Various colors and numbers of colors may be used in this invention but the preferred system, as previously mentioned, is a tricolor arrangement of the three primary colors, red, green and blue.

It will be recognized, however, that, in accordance with the instant disclosure, a plurality of chromatic filter element series may be provided, the number of series being solely determined by the optical parameters of the resultant color screen desired.

For example, a four-color system such as red, green, violet-blue and orange-yellow could also be effectively employed in accordance with the teachings of the instant disclosure.

In the practice of the present invention, additive trichromatic color screens possessing 550, 756 and 1100 lines/color/inch have been employed and it has been found that image resolution obtained by means of the present invention exceeds that obtainable in processes which require transfer of image-forming components to, or from, the ultimate image carrying layer contiguous the color screen. Such increased resolution specifically facilitates the acuity of color reproduction to be achieved by the practice of the invention.

In general, the silver halide emulsion will preferably contain the minimal grain size distribution commensurate with the process speed desired for selected employment of film unit fabricated in order to maximize the average number of grains located behind any one optical filter element and to further maximize the resolution achieved by the film unit's construction. The emulsion will also preferably be panchromatically sensitized to provide equal image production, as a direct function of incident exposing radiation, throughout the response portion of the radiation spectrum to further enhance the acuity of color information recordation by the emulsion.

In addition to the described essential layers, it will be recognized that the film unit may also contain one or more subcoats or layers, which, in turn, may contain one or more additives such as plasticizers, intermediate essential layers for the purpose, for example, of enhancing adhesion, and that one or more of the described layers may comprise a composite of two or more strata which may be contiguous or separated from each other.

Since certain changes may be made in the above product, process and apparatus without departing from the scope of the invention herein involved, it is intended that all matter contained in the above description shall be interpreted as illustrative and not in a limiting sense.

What is claimed is:

1. A photographic film unit which comprises a multicolor screen carrying on one surface a photosensitive silver halide emulsion comprising photosensitive silver halide crystals which contain at least two halides selected from the group consisting of iodide, bromide and chloride and silver precipitating nuclei.

2. A photographic film unit as defined in claim 1 wherein said silver precipitating nuclei are present in a concentration effective to provide a silver image possessing optical density inversely proportional to exposure of the emulsion.

3. A photographic film unit as defined in claim 2 wherein said silver precipitating nuclei are present in a concentration effective to provide a silver image derived from unexposed silver halide crystals possessing greater covering power than a silver image derived from exposed silver halide crystals.

4. A photographic film unit as defined in claim 3 wherein said silver image derived from unexposed silver halide crystals comprises silver of a first physical character and said silver image derived from exposed silver halide crystals comprises silver of a second physical character, said first physical character silver possessing higher optical density than said second physical character silver per unit mass.

5. A photographic film unit as defined in claim 4 which comprises a transparent support carrying on one surface, in order, a multicolor screen and a photosensitive silver halide emulsion comprising, dispersed in a processing composition permeable polymeric binder, photosensitive silver halide crystals which contain at least two halides selected from the group consisting of iodide, bromide and chloride and silver precipitating nuclei present in a concentration effective to provide upon development in the presence of a silver halide solvent, as a function of exposure, a silver image comprising said first and said second physical character silver.

6. A photographic film unit as defined in claim 3 which comprises a transparent support carrying on one surface, in order, a multicolor screen and a photosensitive silver halide emulsion comprising photosensitive silver halide crystals which contain at least two halides selected from the group consisting of iodide, bromide and chloride and silver precipitating nuclei in a concentration effective to provide upon development in the presence of silver halide solvent, as a function of exposure, a silver image derived from development of exposed silver halide crystals possessing a maximum image density at least 1.5 density units less than the maximum density of a silver image derived from development of unexposed silver halide crystals.

7. A photographic film unit as defined in claim 6 which comprises a transparent support carrying on one surface, in order, a multicolor screen and a photosensitive silver halide emulsion comprising photosensitive silver halide crystals which contain at least two halides selected from the group consisting of iodide, bromide and chloride and silver precapitating nuclei dispersed in a processing composition permeable polymeric binder effective to substantially prevent microscopic distortion of image components in registration with individual multicolor screen optical filter elements through which the photosensitive emulsion was exposed, said silver precipitating nuclei present in a concentration effective to provide upon development in the presence of a silver halide solvent, as a function of exposure of the unit to actinic radiation, a minimum image density not in excess of about 0.5 and a maximum image density of not less than about 2.0.

8. A photographic film unit as defined in claim 1 wherein said silver halide crystals comprise silver iodobromide crystals.

9. A photographic film unit as defined in claim 8 wherein said silver iodobromide crystals comprise about 1 to 9 percent, by weight, iodide.

10. A photographic film unit as defined in claim 1 wherein said photosensitive silver halide crystals are panchromatically sensitized.

11. A photographic film unit as defined in claim 10 wherein said multicolor screen is a tricolor additive screen.

12. A photographic film unit as defined in claim 11 wherein said additive tricolor screen comprises red, green and blue colored optical filter elements.

13. A photographic film unit as defined in claim 5 wherein said permeable polymeric binder comprises gelatin.

14. A photographic film unit as defined in claim 13 wherein said gelatin is hardened to the extent necessary to prevent substantial microscopic diffusion of silver image components.

15. A photographic film unit as defined in claim 14 wherein said hardened gelatin binder contains dispersed therein silica.

16. A photographic film unit as defined in claim 15 wherein said silica is present in a concentration of about 0.2 to 1.5 parts silica per part gelatin.

17. A photographic film unit as defined in claim 1 including a separate processing composition permeable polymeric layer containing a silver halide developing agent positioned intermediate said multicolor screen and said photosensitive silver halide emulsion.

18. A photographic film unit as defined in claim 1 wherein said multicolor screen comprises an additive multicolor screen.

19. A photographic film unit as defined in claim 1 wherein said silver precipitating nuclei are dispersed in said emulsion in a concentration of about $1-25 \times 10^{-6}$ moles/ft.$^2$.

20. A photographic film unit as defined in claim 1 wherein said silver precipitating nuclei comprises metallic sulfides, metallic selenides or colloidal noble metals.

21. A photographic film unit as defined in claim 20 which comprises a transparent support carrying on one surface, in order, a trichromatic additive color screen comprising red, green and blue color optical filter elements and a photosensitive silver halide emulsion comprising panchromatically sensitized silver iodobromide crystals and metallic sulfide, metallic selenide or colloidal noble metal silver precipitating nuclei dispersed in a gelatin binder in a concentration effective to provide upon development of exposed silver iodobromide crystals in the presence of a silver halide solvent, as a function of the point-to-point degree of exposure to actinic radiation, a maximum silver image density not in excess of about 0.3 and a maximum silver image density of developed silver derived from unexposed silver halide crystals of not less than about 2.4.

22. A photographic process which comprises, in combination, the steps of exposing a photographic film unit containing a multicolor screen and a photosensitive silver halide emulsion comprising photosensitive silver halide crystals which contain at least two halides selected from the group consisting of iodide, bromide and chloride and silver precipitating nuclei, through said multicolor screen and contacting said exposed emulsion with an aqueous processing composition containing a silver halide developing agent and a silver halide solvent thereby providing a visible silver image to said emulsion in terms of the unexosed areas of said emulsion as the function of the point-to-point degree of emulsion exposure.

23. A photographic process as defined in claim 22 which comprises, in combination, the steps of exposing a photographic film unit containing a transparent support carrying on one surface, in order, a multicolor screen and a photosensitive silver halide emulsion comprising photosensitive silver halide crystals which contain at least two halides selected from the group consisting of iodide, bromide and chloride and silver precipitating nuclei dispersed in a processing composition permeable polymeric binder in a concentration effective to provide a silver image possessing optical density inversely proportional to exposure of the emulsion, said exposure resultant from actinic radiation incident on said transparent support, and contacting said silver halide emulsion with an aqueous processing composition containing a silver halide developing agent and a silver halide solvent to provide a visible silver image to said emulsion possessing optical density inversely proportional to exposure of the emulsion.

24. A photographic process as defined in claim 23 which comprises, in combination, the steps of exposing a photographic film unit containing a transparent support carrying on one surface, in order, a multicolor screen and a photosensitive silver halide emulsion comprising photosensitive silver halide crystals which contain at least two halides selected from the group consisting of iodide, bromide and chloride and silver precipitating nuclei dispersed in a processing composition permeable polymeric binder in a concentration effective to provide a silver image derived from unexposed silver halide crystals possessing greater covering power than a silver image derived from exposed silver halide crystals, said exposure resultant from actinic radiation incident on said transparent support, and contacting said silver halide emulsion with an aqueous processing composition containing a silver halide developing agent and a silver halide solvent for a period of time effective to provide a visible silver image to said emulsion, as a function of emulsion exposure, derived from unexposed silver halide crystals possessing greater covering power than the silver image derived from exposed silver halide crystals.

25. A photographic process as defined in claim 24 wherein said silver image derived from unexposed silver halide crystals comprises silver of a first phyhical character and said silver image derived from exposed silver halide crystals comprises silver of a second physical character, said, first physical character silver possessing higher optical density than said second physical character silver per unit means.

26. A photographic process as defined in claim 24 which comprises, in combination, the steps of exposing a photographic film unit containing a transparent support carrying on one surface, in order, a multicolor screen and a photosensitive silver halide emulsion comprising photosensitive silver halide crystals which contain at least two halides selected from the group consisting of iodide, bromide and chloride and silver precipitating nuclei dispersed in a processing composition permeable polymeric binder in a concentration effective to provide upon development, as a function of exposure, a silver image derived from development of unexposed silver halide crystals possessing a maximum image density at least 1.5 density units greater than the maximum density of the silver image derived from development of exposed silver halide crystals, said exposure resultant from actinic radiation incident on said transparent support, and contacting said silver halide emulsion with an aqueous processing composition containing a silver halide developing agent and a silver halide solvent for a period of time effective to provide a visible silver image to said emulsion in terms of the unexposed areas of said emulsion as a function of the point-to-point degree of emulsion exposure, said visible silver image derived from development of unexposed silver halide crystals and possessing a maximum image density at least 1.5 density units greater the maximum density of developed silver derived from development of exposed silver halide crystals.

27. A photographic process as defined in claim 26 which comprises, in combination, the steps of exposing a photographic film unit which comprises a transparent support carrying on one surface, in order, a multicolor screen and a photosensitive silver halide emulsion comprising photosensitive silver halide crystals which contain at least two halides selected from the group consisting of iodide, bromide and chloride and silver precipitating nuclei dispersed in a processing composition permeable polymeric binder in a concentration effective to provide upon development of exposed silver halide crystals a maximum silver image density not in excess of about 0.5 and a maximum silver image density derived from unexposed silver halide crystals upon development of not less than about 2.0, said exposure accomplished by actinic radiation incident on said transparent support, and contacting said silver halide emulsion with an aqueous processing composition containing a silver halide developing agent and a silver halide solvent for a sufficient time to provide a silver image to said emulsion comprising a maximum density of image silver derived from development of unexposed silver halide crystals of not less than about 2.0 and a maximum density of image silver derived from development of exposed silver halide crystals not in excess of about 0.5.

28. A photographic process as defined in claim 23 wherein said processing composition permeable polymeric binder comprises gelatin.

29. A photographic process as defined in claim 28 which comprises, in combination, the steps of exposing a photographic film unit containing a transparent support carrying on one surface, in order, a trichromatic additive color screen and a photosensitive silver halide emulsion comprising panchromatically sensitized silver iodobromide crystals and silver precipitating nuclei dispersed in a processing composition permeable gelatin binder possessing a lattice effective to substantially prevent microscopic diffusion of silver image components, said silver precipitating nuclei present in a concentration effective to provide, upon development in the presence of a silver halide solvent and as a function of exposure, image silver derived from development of exposed silver iodobromide crystals possessing a maximum silver image density less than about 0.3 and maximum silver image density derived from development of unexposed silver iodobromide crystals greater than about 2.4, said exposure accomplished by actinic radiation incident on said transparent support, and contacting said exposed emulsion with an aqueous processing composition containing a silver halide developing agent and a silver halide solvent for a time sufficient to provide a silver image to said emulsion in terms of the unexposed areas of said emulsion possessing a maximum silver image density of not less than about 2.4 and a silver image to said emulsion in terms of the exposed areas of said emulsion possessing a maximum silver image density not in excess of about 0.3.

30. A photographic process as defined in claim 29 wherein said silver precipitating nuclei comprises metallic sulfides, metallic selenides or colloidal noble metals.

31. A photographic process as defined in claim 30 wherein said silver precipitating nuclei are dispersed in said silver iodobromide emulsion in a centration of about 1 to $25 \times 10^{-6}$ moles/ft.$^2$.

32. A photographic process as defined in claim 28 wherein said panchromatically sensitized emulsion additionally contains silica dispersed therein.

33. A photographic process as defined in claim 22 wherein said silver halide developing agent is disposed in said film unit prior to said contact of said unit with said aqueous processing composition.

34. A photographic process as defined in claim 22 wherein said multicolor screen comprises an additive multicolor screen.

35. A photographic process as defined in claim 34 wherein said multicolor screen comprises a trichromatic additive color screen comprising red, green and blue chromatic filter elements.

36. A photographic process as defined in claim 22 wherein said silver halide emulsion comprises a silver iodobromide emulsion.

37. A photographic process as defined in claim 36 wherein said silver iodobromide emulsion is panchromatically sensitized.

38. A photographic process as defined in claim 37 wherein said silver iodobromide emulsion comprises silver iodobromide crystals containing about 1 to 9 percent, by weight, iodide.

39. A photographic product which comprises a composite film unit including a multicolor screen having associated therewith a developed, photoexposed silver halide stratum which comprised photosensitive silver halide crystals including at least two halides selected from the group consisting of iodide, bromide and chloride containing a substantially uniform concentration of silver therethrough and a silver image possessing optical density inversely proportional to photoexposure of said stratum.

40. A photographic product as defined in claim 39 wherein said silver image includes a positive silver image in terms of unexposed areas of said stratum comprising silver of a first physical character and a negative silver image in terms of exposed areas of said stratum comprising silver of a second physical character, said first physical character silver possessing higher optical density per unit than said second physical character silver.

41. A photographic product as defined in claim 40 wherein said positive silver image possesses maximum density in unexposed areas of said silver halide stratum at least 1.5 density units greater than the maximum density of said negative silver image in exposed areas of said silver halide stratum.

42. A photographic product as defined in calim 41 wherein said negative silver image possesses a maximum density in exposed areas of said silver halide stratum not in excess of about 0.5 and a maximum denstiy of said positive silver image in unexposed areas of said silver halide stratum not less than about 2.0.

43. A photographic product as defined in claim 39 wherein said multicolor screen is an additive multicolor screen.

44. A photographic product as defined in claim 43 wherein said additive multicolor screen is carried on a flexible transparent support and comprises a trichromatic color screen comprising red, green and blue colored optical filter elements.

References Cited

UNITED STATES PATENTS

| 2,614,926 | 10/1952 | Land | 96—29 |
| 2,712,995 | 7/1955 | Weyde | 96—3 |
| 3,284,208 | 11/1966 | Land | 96—118 |

NORMAN G. TORCHIN, Primary Examiner

A. T. SURO PICO, Assistant Examiner

U.S. Cl. X.R.

96—118